United States Patent
Porcari et al.

(10) Patent No.: US 7,376,635 B1
(45) Date of Patent: May 20, 2008

(54) THEME-BASED SYSTEM AND METHOD FOR CLASSIFYING DOCUMENTS

(75) Inventors: Damian Porcari, Farmington Hills, MI (US); Thomas Anthony Montgomery, Plymouth, MI (US); Bryan Roger Goodman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1039 days.

(21) Appl. No.: 09/621,393

(22) Filed: Jul. 21, 2000

(51) Int. Cl.
*G06F 7/00* (2006.01)
*G06F 17/00* (2006.01)

(52) U.S. Cl. .......................... 707/1; 715/514; 715/513
(58) Field of Classification Search .................... 707/5, 707/6, 104.1, 1, 7, 3; 715/513, 500, 514
See application file for complete search history.

(56) References Cited

U.S. PATENT DOCUMENTS

| | | |
|---|---|---|
| 5,175,681 A | 12/1992 | Iwai et al. |
| 5,276,869 A | 1/1994 | Forrest et al. |
| 5,297,039 A * | 3/1994 | Kanegami et al. ............. 707/5 |
| 5,329,447 A | 7/1994 | Leedom, Jr. |
| 5,377,355 A | 12/1994 | Hager et al. |
| 5,418,802 A | 5/1995 | Chwalck |
| 5,418,946 A * | 5/1995 | Mori ............................. 707/1 |
| 5,625,767 A * | 4/1997 | Bartell et al. ................ 345/440 |
| 5,721,910 A * | 2/1998 | Unger et al. ............. 707/104.1 |
| 5,721,940 A | 2/1998 | Luther et al. |
| 5,754,840 A | 5/1998 | Rivette et al. |
| 5,758,095 A | 5/1998 | Albaum et al. |
| 5,794,236 A | 8/1998 | Mehrle |
| 5,870,740 A * | 2/1999 | Rose et al. ..................... 707/5 |
| 5,875,431 A | 2/1999 | Heckman et al. |
| 5,887,120 A | 3/1999 | Wical |
| 5,911,140 A * | 6/1999 | Tukey et al. ................... 707/5 |
| 5,930,788 A | 7/1999 | Wical |
| 5,956,687 A | 9/1999 | Wamsley et al. |
| 5,987,464 A | 11/1999 | Schneider |
| 5,991,751 A | 11/1999 | Rivette et al. |
| 6,014,663 A | 1/2000 | Rivette et al. |
| 6,038,561 A * | 3/2000 | Snyder et al. .................. 707/6 |

(Continued)

FOREIGN PATENT DOCUMENTS

EP  0475869 A2  3/1992

(Continued)

OTHER PUBLICATIONS

Examiner Handbook to the U.S. Patent Classification System, Revised Feb. 1999.*

(Continued)

*Primary Examiner*—Sam Rimell
(74) *Attorney, Agent, or Firm*—Damian Porcari; Brooks Kushman P.C.

(57) ABSTRACT

A classification system (10) having a controller (12), a document storage memory (14), and a document input (16) is used to classify documents (20). The controller (12) is programmed to generate a theme score from a plurality of source documents in a plurality of predefined source documents. A theme score is also generated for the unclassified document. The unclassified document theme score and the theme scores for the various classes are compared and the unclassified document is classified into the classification having the nearest theme score.

7 Claims, 6 Drawing Sheets

U.S. PATENT DOCUMENTS

| | | | |
|---|---|---|---|
| 6,041,303 A | | 3/2000 | Mathews |
| 6,073,108 A | | 6/2000 | Peterson |
| 6,314,421 B1 | | 11/2001 | Sharnoff et al. |
| 6,339,767 B1 | | 1/2002 | Rivette et al. |
| 6,389,436 B1 | * | 5/2002 | Chakrabarti et al. ........ 715/513 |
| 6,460,034 B1 | * | 10/2002 | Wical ............................ 707/5 |
| 6,556,992 B1 | | 4/2003 | Barney et al. |
| 6,591,261 B1 | | 7/2003 | Arthurs |
| 6,665,656 B1 | | 12/2003 | Carter |
| 2001/0037324 A1 | * | 11/2001 | Agrawal et al. ................ 707/1 |
| 2003/0004927 A1 | * | 1/2003 | Zhai ............................... 707/1 |
| 2003/0120653 A1 | * | 6/2003 | Brady et al. ................... 707/7 |

FOREIGN PATENT DOCUMENTS

| | | |
|---|---|---|
| EP | 0387462 B1 | 5/1996 |
| EP | 0 750 266 B1 | 12/1996 |
| EP | 1049027 A2 | 11/2000 |
| JP | 10126408 | 5/1998 |
| NL | 9100425 | 3/1991 |
| WO | WO 00/54185 | 9/2000 |
| WO | WO 01/08031 | 2/2001 |
| WO | WO 01/08031 A2 | 2/2001 |
| WO | WO 01/26002 A1 | 4/2001 |
| WO | WO 01/35277 A1 | 5/2001 |

OTHER PUBLICATIONS

Sebastiani, Fabrizio, "A Tutorial On Automated Text Categorisation", Proceedings of ASAI-99, 1st Argentinian Symposium on Artificial Intelligence, Buenos Aires, AR, 1999, pp. 7-35.

Larkey, Leah S., "A Patent Search And Classification System"; Umass CIIR Technical Report lr-162, 1999.

Junker, Markus; Hoch, Rainer, "Evaluating OCR and Non-OCR Text Representations for Learning Document Classifers", (Internet: http:/www.dfki.uni.ki.de/~junker/download/fgml96.pdf.

Appelrath, Dr. h-J; Moeller, G., "A Systematic Listing of the German WWW", (Internet: http//216.239.39.104/translate_c?hl+en &sl+de&u+http://www.offis.uni-oldenburg.de/ueber/jahresbericht/jb1997/p9_3.php&prev=/search).

Metastorm e.work 5.2 software as used in the UK Patent Office—feature sheet included. Note e-work notify—active notification i.e. prompting. Note also the web site relating to this software at http://www.metastorm.com/products/overview_index.asp.

IBM Patent Server/College of Engineering, University of Wisconsin-Madison [retrieved Mar. 7, 2002]. Retrieved from the Internet via: http://www.engr.wisc.edu/news/low/1997/Nov24.html.

Delphion/ History/ The Delphion Story [retrieved Mar. 7, 2002]. Retrieved from the Internet via: http://www.delphion.com/about-history.

Scalable feature selection, classification and signature generation for organizing large text databases into hierarchial topic taxonomies, Chakrabarti S., Dom B., 163-178.

Junker M. and Abecker A.: Einstatz Maschineller Lernverfahren inder Dokumentklassifikation (Application of Machine-Based Learning Procedures In Document Classification), 1996, p. 1-6) [Internet: http://www.defki.uni.kl.de/~junker/download/fgml96.pdf].

Structure of the IPC. World Intellectual Property Organization, p. 1-2 [Internet: http://www.wipo.int/classifications/en/].

* cited by examiner

AN APPARATUS FOR CONTROLLING THE OPERATION OF AN ENGINE IS DISCLOSED. THE APPARATUS INCLUDES A PASSAGE FOR SUPPLYING AND AIR-FUEL MIXTURE TO THE ENGINE. THE ENGINE BURNS THE MIXTURE TO PRODUCE TORQUE. A VALVE ADJUSTS THE AIR-FUEL MIXTURE BY...

| 0 | HOCKEY |
| 1 | CONTROL |
| 2 | APPARATUS |
| 3 | ENGINE |
| 0 | PRESIDENT |
| ⋮ | ⋮ |
| 2 | AIR-FUEL MIXTURE |
| 1 | VALVE |

FIG. 6

| DOCUMENTS | "WHEAT" | "TRADE" | "INCREASE" | "EXPORT" | CATEGORIZATION |
|---|---|---|---|---|---|
| D1 | 0 | 1 | 0 | 1 | $C_1$ |
| D2 | 0 | 1 | 1 | 1 | $C_1$ |
| D3 | 1 | 0 | 0 | 0 | $C_2$ |
| D4 | 1 | 0 | 1 | 1 | $C_2$ |

FIG. 7

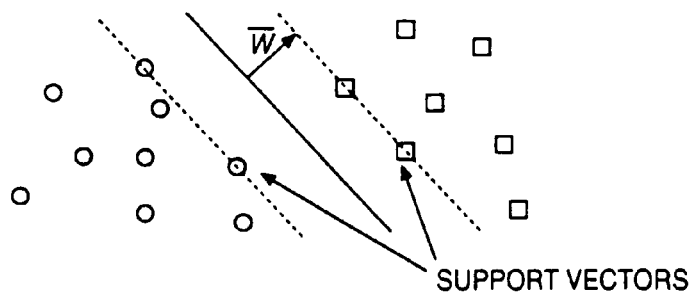

FIG. 8

| IN CLASS? | CLASSIFIED YES | CLASSIFIED NO | RECALL |
|---|---|---|---|
| TRUTH YES | a | b | a / a + b |
| TRUTH NO | c | d | |
| PRECISION | a / a +c | | |

| CATEGORY | NUMBER OF TRAINING | NUMBER OF TESTING |
|---|---|---|
| EARN | 2877 | 1088 |
| ACQ | 1650 | 719 |
| MONEY-FX | 539 | 180 |
| GRAIN | 434 | 149 |
| CRUDE | 391 | 189 |
| TRADE | 369 | 117 |
| INTEREST | 347 | 133 |
| SHIP | 198 | 89 |
| WHEAT | 212 | 71 |
| CORN | 183 | 56 |

| CATEGORY | TOTAL NUMBER OF TEST DOCUMENTS | TOTAL NUMBER OF CORRECTLY CLASSIFIED DOCUMENTS | DIFFERNCE |
|---|---|---|---|
| EARN | 1088 | 1075 | 13 |
| ACQ | 719 | 690 | 29 |
| MONEY-FX | 180 | 149 | 31 |
| GRAIN | 149 | 137 | 12 |
| CRUDE | 189 | 169 | 20 |
| TRADE | 117 | 90 | 27 |
| INTEREST | 133 | 107 | 26 |
| SHIP | 89 | 76 | 13 |
| WHEAT | 71 | 59 | 12 |
| CORN | 56 | 41 | 15 |

THEME-BASED SYSTEM AND METHOD FOR CLASSIFYING DOCUMENTS

TECHNICAL FIELD

The present invention relates generally to the field of document classification, and more particularly, to a method and system for classifying documents automatically using themes of a predetermined classification.

BACKGROUND

Companies, and in particular, companies in technical fields classify various information to various classifications for the company archives and for other purposes. One such other purpose is for patent searching. Companies may obtain various patents to store into a company archive. Commonly this is done using a group of trained searchers that read and classify the patents according to a pre-identified classification system. One problem with such a system is that the searchers must be familiar with the classification system and the underlying technology to properly classify the document. This is a very labor intensive and costly process because a substantial amount of time is required to classify the documents.

As technology changes, it may be desirable from time to time to change classification systems or add subclasses within various classifications. To accomplish this in a manual fashion would require searchers a substantial amount of time to re-read the patents or other documents in a class and classify them into a new class or a subclass.

It would therefore be desirable to provide a classification system capable of automatically determining the classifications of documents and capable of reclassifying documents when reclassification or division of classes is desired.

SUMMARY OF THE INVENTION

It is therefore one object of the invention to provide a classification system capable of automatically classifying documents.

In one aspect of the invention a method for classifying documents comprises the steps of:

defining a plurality of classes;

identifying source documents of each of said plurality of classes;

generating a classification theme for each of said classes;

entering an unclassified document into the system;

generating an unclassified document theme corresponding to said source documents; and classifying the document into one of said plurality of classes when the unclassified document theme is substantially similar to the class theme score.

In a further aspect of the invention, a classification system including a controller, a document storage memory, and a document input is used to unclassify documents. The controller is programmed to generate a theme score from a plurality of source documents in a plurality of predefined source documents. A theme score is also generated for the unclassified document. The unclassified document theme score and the theme scores for the various classes are compared and the unclassified document is classified into the classification having the nearest theme score.

One advantage of the invention is that preclassified documents may be reclassified into various classes or subclasses automatically. Therefore, as technology changes, the classes and subclasses may be updated.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 6 is a feature vector of a document.

FIG. 7 is a table showing examples of information gain.

FIG. 8 is a support vector machine in feature space.

DESCRIPTION OF THE PREFERRED EMBODIMENT

In the following figures, specific examples of various uses of the present invention are illustrated. Although patent classification is a highly suitable use, other uses of the present invention will be evident to those skilled in the art.

Figure 1:
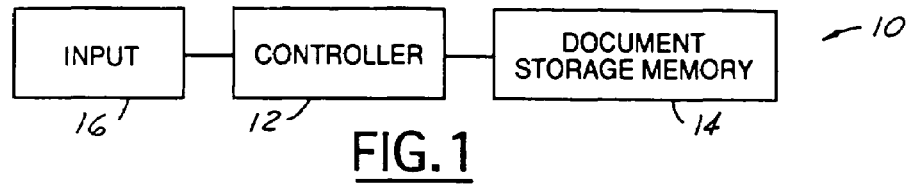
FIG. 1 is high level block diagrammatic view of a classification system according to the present invention.

Referring now to FIG. 1, a classification system 10 has a controller 12 that is coupled to a document storage memory 14. Controller 12 is also coupled to a document input 16. Controller 12 preferably consists of a computer that is programmed to perform the theme-based classification as described below. Document storage memory 14 stores the various documents and classifications therein. Document storage memory 14 may be comprised of various types of storage including a hard disk drive or plurality of hard disk drives coupled together. Document storage memory 14 should be capable of storing a number of documents and capable of storing further documents as documents are classified. The document storage memory 14 is preferably capable of being supplemented when additional storage capacity is desired.

Input 16 may comprise various types of input such as a scanner or a direct interface to the Internet. Input 16 provides digitally readable documents to controller 12 for classification. In one embodiment, input 16 may be coupled to the Patent Office through a web browser. Issuing patents every Tuesday may be classified automatically by controller 12 and stored in document storage memory 14. Of course, various other means for coupling controller 12 to documents would be evident to those skilled in the art including different document sources. Input 16 may, for example, comprise a CD ROM having a plurality of unclassified or crudely classified documents thereon. Controller 12 may be used to classify the documents on the CD ROM and store them within document storage memory 14 in a classified manner.

Figure 2:
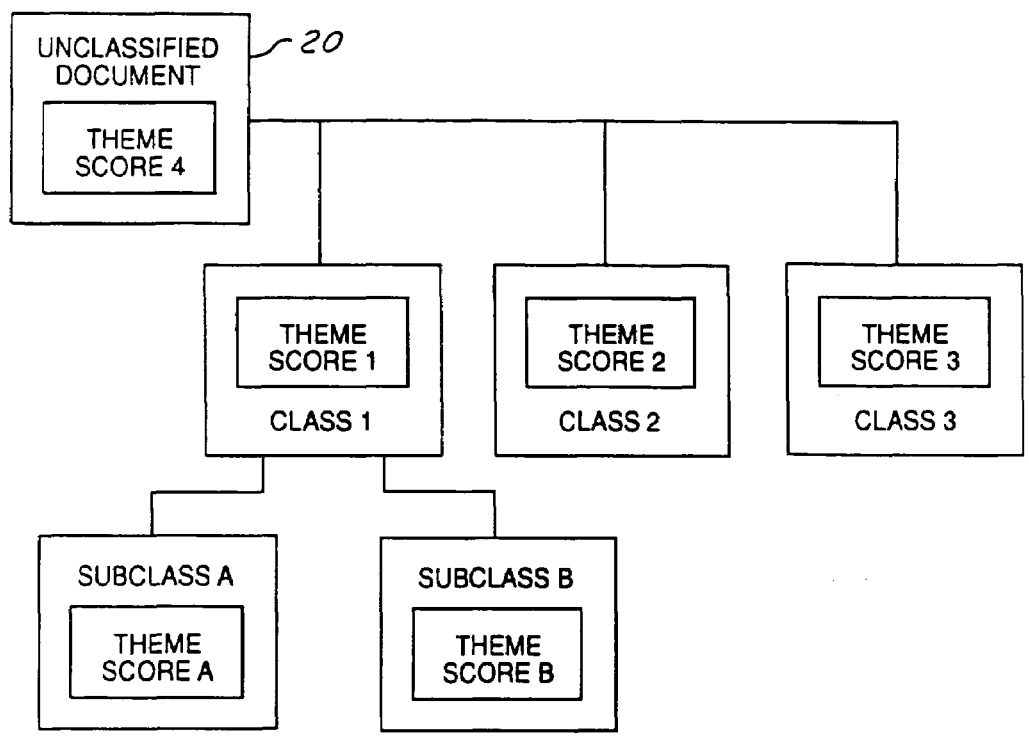
FIG. 2 is a classification hierarchy illustration according to the present invention.

Referring now to FIG. 2, an unclassified document 20 is classified into a plurality of classes; class 1, class 2, and class 3. Class 1 has two subclasses; subclass 1 and subclass 2. Although only class 1 is illustrated as having subclasses, each of the various classes may have subclasses. Also, each subclass may have further subclasses. Each class has a respective theme score: theme score 1, theme score 2 and theme score 3. Each subclass also has a respective theme score: theme score A and theme score B. The theme scores identify the theme of the class and subclass. Unclassified document is also given a theme score 4 that is compared to the theme scores of the various classes and subclasses. The unclassified document is classified into the class and/or subclasses that correspond most closely with the theme score thereof.

Figure 3:
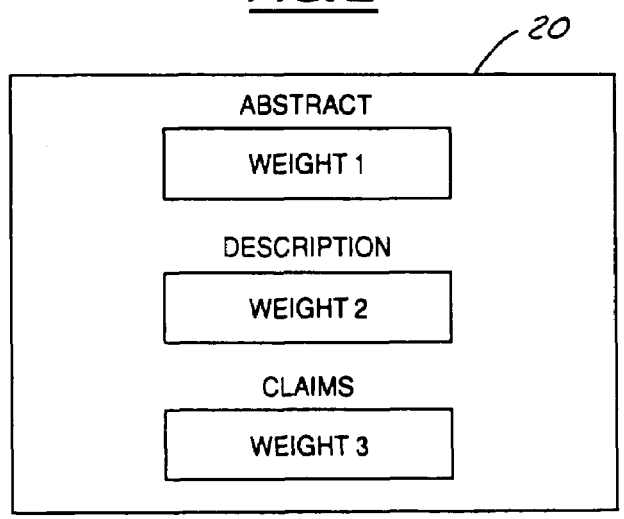
FIG. 3 is a block diagram of a document according to the present invention.
Figure 4:
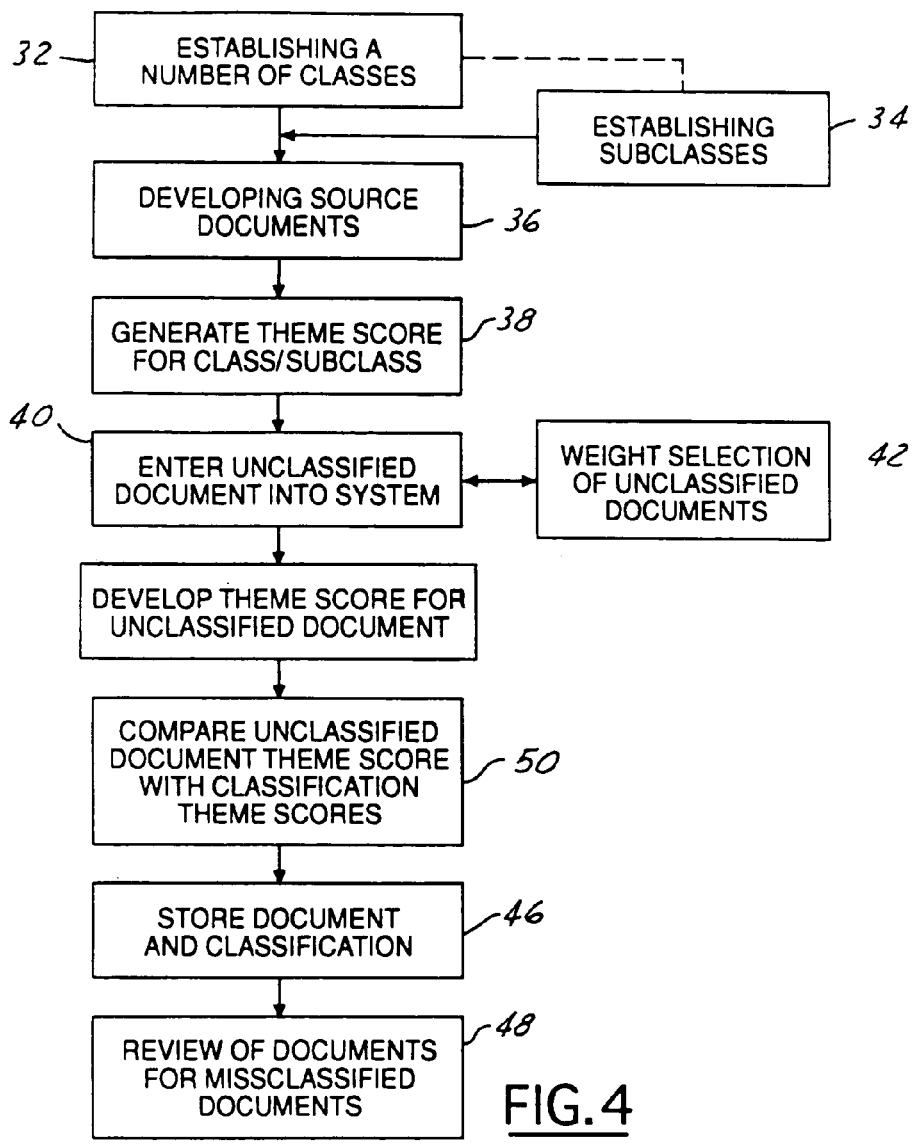
FIG. 4 is a flow chart classification process according to the present invention.

Referring now to FIG. 3, unclassified document 20 may have a variety of sections represented by reference numerals 22, 24, and 26. Carrying through with the patent theme, section 22 may correspond to the abstract, section 24 may correspond to a description, and section 26 may correspond to the claims. Other sections may also be used such as the international or U.S. patent classifications. Of course, other sections may be delineated depending on the type of document used. As will be further described below, each document area may have different weight in the classification scheme. As illustrated, abstract section has a weight 1, description section has weight 2, and claims section has weight 3. Preferably, only selected words are used in the weighting system. As will be further described below, various nouns and verbs may be given different weight than other parts of speech.

Figure 5:
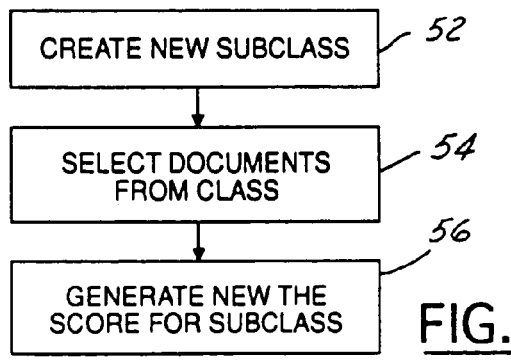
FIG. 5 is a flow chart of a reclassification process according to the present invention.

Referring now to FIG. 5, a method 30 for classifying documents is described. In step 32 a number of classes for classification is established. At the same time, if desired, a number of subclasses may also be developed in step 34. In step 36, a number of source documents are identified for each of the classes and if desired subclasses. These source documents are meant to suitably represent the technology or field of the particular class.

The source document or source documents are used to develop a theme score for the class and subclass. The theme score represents a particular value for the subject matter of the class. Various known methods may be used to generate the theme value. For example, numerous algorithms for natural language searching may be used. The natural language search terms are developed from the source documents. Natural language search as used in the present invention is used to refer to a question, sentence, sentence fragment, single word or term which describes (in natural language form) a particular topic (theme) or the definition for the classification uses to identify the documents to be classified. The natural language terms are arithmatically weighted according to the known methods of selecting the importance of the words to obtain the theme score. In step 40, an unclassified document is entered into the system. The unclassified document is preferably in digitally readable form and may comprise a word processing document, an Internet file, or other type of digitally readable file. In step 42, which is optional, sections of the unclassified document may be weighted. This weighting will establish an importance level for various sections with respect to developing the theme score for the unclassified document. In step 44, the theme score for the unclassified document is developed. The theme score is developed in a corresponding manner to the theme score for the classification. In step 46, the theme score of the unclassified document is compared with the various classes. The unclassified document is thus categorized into the classification having the closest theme score. If the classification has subclasses, the theme score of the subclasses is compared with the theme score of the unclassified document. Once a classification and subclassification have been determined, the documents are stored along with its classification and subclassification into the document storage memory 14.

To enhance the integrity of the system, a review of misclassified documents may also be performed. When searchers or other users of the information in the system find documents that have been misclassified they may be identified and provided a negative weight in the system. This negative weight will prevent like documents from being classified in the similar wrong class. The review of the documents for misclassified documents is performed in step 50.

Referring now to FIG. 5, one advantage of the system is that subclasses and reclassification may be performed automatically to create a new subclass. A new subclass is defined in step 52. In step 54, selected documents from the class to be divided are selected for the subclass. In step 56 a new theme score for the new subclass represented by the selected documents is performed. Thus, the theme score of the unclassified document is used for comparison with the theme score for the new subclass. The other documents in the class may be re-evaluated to determined if they should be included in the new subclass.

In a similar manner, if reclassification is performed source documents are obtained for the new classes. Each of the documents in the system may then be re-evaluated to determine the particular new class into which they should be categorized.

EXAMPLE

An example of the present invention is set forth below:

Documents, which typically are strings of characters, have to be transformed into a representation suitable for the learning algorithms and the classification tasks. The methods that we have examined are based on the vector space method in which each document is represented as a vector of words or attributes. Each distinct word corresponds to an element of the vector whose numerical value is the number of occurrences of the word in the document. FIG. 6 shows an example feature vector of a particular document. Notice that word order is lost in this representation, only word frequency is retained. Empirical research has demonstrated that classification based on statistical word counts can be quite accurate, and it has the advantage over semantic methods of not being domain specific.

Words with very low or very high frequency of occurrence in the document set, as well as a list of non-informative "stop words" are not included in the document vectors. A typical stop word list contains about 300 or 400 words including prepositions, articles, pronouns and conjunctions like "the" and "of". To improve recall and further reduce the document vector length, word stems are also used. The word stem is derived from the occurrence form of a word by removing case and stripping suffix information. For example "compute", "computes" and "computing" are all mapped to the same stem "compute".

While term frequency, TF, gives a statistical measure to how topical a word may be in a given document, to better represent the data it has been shown that scaling the feature vector with inverse document frequency IDF (i.e. using TFIDF weighting) leads to an improved performance. We represent a document vector entry by $f_{ij}$ for the term frequency of word $w_i$ in the document $d_j$. IDF($w_i$) is defined as:

$$IDF(w_i) = \log\left(\frac{N}{n_i}\right) + 1$$

where N is the total number of training documents and $n_i$ is the number of documents that contain word $w_i$. Intuitively, the IDF($w_i$) adds more influence to the feature value for the words that appear in fewer documents. Words that are common among the training documents do not appreciably help to distinguish between the documents, and therefore have small IDF weights. In order to minimize effects of document length and enhance classification accuracy, each document vector $d_i$ is normalized to unit length.

In text categorization the dimension of the feature space (roughly the size of the vocabulary of the document set) can be quite large. Feature selection attempts to remove less representative words from the feature space in order to improve categorization effectiveness, reduce computational complexity and avoid overfitting. Feature selection is based on a thresholded criterion to achieve a desired degree of term elimination from the full vocabulary of a document corpus. These criteria are: document frequency, information gain, mutual information, a $\chi^2$ statistic, and term strength. The most commonly used and often most effective method is the information gain criterion. Information gain is employed from the entropy concept in information theory. Let C be a random variable over all classes and W be a random variable over the absence or presence of word w in a document, where C takes on values $$\{C_i\}_{i=1}^m$$

and W takes on values $\{0,1\}$ for the word being absent or present in a document. Information gain is the difference between the entropy of the class variable, H(C), and the entropy of the class variable conditioned on the absence or presence of the term, H(C|W).

$$I(C;W) = H(C) - H(C|W)$$

$$I(C;W) = H(C) - H(C|W) = -\sum_{i=1}^m Pr(c_i)\log Pr(c_i) + \sum_{w\in\{0,1\}} Pr(w)\sum_{i=1}^m Pr(c_i|w)\log Pr(c_i|w) \quad (2.1)$$

where the probabilities are calculated by sums over all documents. Pr(ci) is the number of documents with class label ci divided by the total number of documents; Pr(w) is the number of documents containing word w divided by the total number of documents; and Pr(ci|w) is the number of documents with class label ci that contain word w divided by the number of documents containing word w. Entropy measures the uncertainty of a random variable. Information gain measures the uncertainty reduction of category prediction by partitioning the examples according to the word. So this measure shows the importance of the word to the categorization over all the categories. By convention, 0 log 0=0. To illustrate the information gain concept, consider the small example of FIG. 7. In general, there should be enough examples to show the distribution of the probabilities. Here we have four newswire documents from categories c1=trade and c2=grain. We picked four words "wheat", "trade" "increase" and "export" to calculate their information gains based on the given categorization of the four documents.

The probabilities needed for calculating the information gain of the words are $Pr(c_1)=Pr(c_2)=½$ $Pr(\text{"wheat"})=Pr(\text{"trade"})=Pr(\text{"increase"})=½$ $Pr(\text{"export"})=¾, Pr(\text{not "export"})=¼$ $Pr(\text{not "wheat"})=Pr(\text{not "trade"})=Pr(\text{not "increase"})=½$ $Pr(c_1|\text{"wheat"})=0; Pr(c_2|\text{"wheat"})=1$ $Pr(c_1|\text{not "wheat"})=1; Pr(c_2|\text{not "wheat"})=0$ $Pr(c_1|\text{"trade"})=1; Pr(c_2|\text{"trade"})=0$ $Pr(c_1|\text{not "trade"})=0; Pr(c_2|\text{not "trade"})=1$ $Pr(c_1|\text{"increase"})=½; Pr(c_2|\text{"increase"})=½$ $Pr(c_1|\text{not "increase"})=½; Pr(c_2|\text{not "increase"})=½$ $Pr(c_1|\text{"export"})=⅔; Pr(c_2|\text{"export"})=⅓$ $Pr(c_1|\text{not "export"})=0; Pr(c_2|\text{not "export"})=1;$ By equation (2.1), the information gain of word "wheat" with respect to the categories $c_1$ and $c_2$ can be calculated as $I(C; \text{"wheat"}) = -Pr(c_1)\log Pr(c_1) - Pr(c_2)\log Pr(c_2)$ $$I(C; ''\text{wheat}'') = -Pr(c_1)\log Pr(c_1) - Pr(c_2)\log Pr(c_2) + Pr(''\text{wheat}'')\sum_{i=1}^{2} Pr(c_i|''\text{wheat}'')\log Pr(c_i|''\text{wheat}'') + Pr(not''\text{wheat}'')\sum_{i=1}^{2} Pr(c_i|not''\text{wheat}'')\log Pr(c_i|not''\text{wheat}'') = -\frac{1}{2}\log\frac{1}{2} - \frac{1}{2}\log\frac{1}{2} + \frac{1}{2}(0\log 0 + 1\log 1) + \frac{1}{2}(1\log 1 + 0\log 0) = 1$$

Similarly, the information gain of other words can be calculated and we have $I(C;\text{"trade"})=1;$ $I(C;\text{"increase"})=0;$ $I(C;\text{"export"})=0.31$ From FIG. 7 it may be observed that the presence and absense of words "wheat" and "trade" can correctly categorize the documents and this agrees with the fact that "wheat" and "trade" have high information gain. The word "increase" shows little correlation of its presence and absense to the categorization. According to the above calculation it has information gain equal to 0. So information gain is used as a measure to select terms that best represent the categorization.

Given a training document set, for each unique term we compute the information gain, and remove from the feature space those terms whose information gain is less than some predetermined threshold.

A classifier is a map that assigns an input attribute vector, $x=(w_1, w_2, w_3, \ldots w_n)$, to one or more target values or classes. In our investigation we compared three methods: support vector machines, k-nearest neighbor and naïve Bayes.

Classification based upon Support Vector Machines (SVM) has developed rapidly in the last several years. It was introduced by Vapnik in 1995 for solving two-class pattern recognition problems [25]. Suppose the training data is (x1, y1), (x2, y2), ..., (xl, yl), where xi is the attribute vector of document i and yi is the target value of xi which is either 1 or −1 depending on whether document i is in one class or the other. SVM, operating as a two-class classifier, is to construct an optimal hyperplane $w \cdot x + b = 0$ that separates the data points in two classes with maximum margin such that $y_i(w \cdot x + b) \geq 1$, i=1, ... l. (See FIG. 8).

The optimal hyperplane can be defined by the vector $w_0$ and the constant $b_0$ that minimize $$\frac{1}{2}\|w\|^2$$

subject to constraints $y_i(w \cdot x_i + b) \geq 1$. When the problem is not linearly separable this method can be augmented by introducing a soft margin and mapping the training data nonlinearly into a higher-dimensional feature space via a function $\Phi$, then construct an optimal hyperplane in the feature space. In general with threshold T the hyperplane decision function can be determined as follows:

SVM will assign to each new input vector x a target value 1 if $$\sum_{i=1}^{l} y_i \alpha_i (\Phi^T(x)\Phi(x_i)) + b \geq T \text{ or } \sum_{i=1}^{l} y_i \alpha_i k(x, x_i) + b \geq T$$

and −1 otherwise where $\Phi$ is the nonlinear map from input space to the feature space and $k(x, x_i) = \Phi^T(x)\Phi(x_i)$ is the kernel function, and $\alpha_1, \alpha_2, \ldots, \alpha_l$ are the weights trained through the following quadratic optimization problem:

$$\text{minimize: } w(\alpha) = -\sum_{i=1}^{l} \alpha_i + \frac{1}{2} \sum_{i=1}^{l} \sum_{j=1}^{l} y_i y_j \alpha_i \alpha_j k(x_i, x_j)$$

$$\text{subject to: } \sum_{i=1}^{l} y_i \alpha_i = 0$$

$$\forall i: 0 \leq \alpha_i \leq C$$

The kernel function can be the following types of functions:
linear function
polynomial $(x \cdot y + c)^d$ of degree d
radial basis function $\exp(-\|x-y\|^2/2\sigma^2)$
sigmoid function $\tanh(\kappa(x \cdot y) + \Theta)$ An interesting property of SVM is that the optimal hyperplane is determined only by the data points located on the margin. These data points are called support vectors. The quadratic optimization problem stated above can be solved by a quadratic programming (QP) solver. However, many QP methods can be very slow for large problems such as text categorization. Different training algorithms that decompose the problem into a series of smaller tasks have been developed. Relatively efficient implementations of SVMs include the SVM$^{light}$ system by Joachims and the Sequential Minimal Optimization (SMO) algorithm by Platt. In addition to regular SVMs Joachims also introduced transductive SVMs. When there is very little training data it is crucial that the method can generalize well. Transductive SVMs take into account both training data and testing data to determine the hyperplane and margin that separate them.

Notice that SVM is a two-class classifier. To extend it to multiple classes we used a one class versus all other classes scheme, training a separate SVM classifier for each class. Note that different k-class classification schemes based on two-class classifiers have been developed.

In our experiments we used SVM$^{light}$ which includes both regular (inductive) SVMs and transductive SVMs.

The most basic instance-based method is the k-Nearest Neighbor algorithm (kNN). The idea is very simple. Given a test document, the system finds the k nearest neighbors among the training documents, and the categories associated with the k neighbors are weighted based on the distances or the similarities of the test document and the k nearest neighbors from the training set. The category or categories with weights greater than or equal to a certain threshold are assigned to the test document as its classification. The nearest neighbors can be found by inner products, cosines or other distance metrics. In our implementation we used cosine to measure the similarity of vectors which is defined by $$\text{cosine}(x, x_i) = \frac{x \cdot x_i}{\|x\| \cdot \|x_i\|}$$

Since both x and $x_i$ are normalized to unit length, cosine $(x, x_i) = x \cdot x_i$. To state the method formally, let x be a test document vector. Let $x_1, x_2, \ldots, x_k$ be the k nearest neighbors of x in terms of the cosines between two document vectors, and let $c_1, c_2, \ldots c_l$ be the categories of the k neighbors. With the threshold T the classification of x is determined by $$\left\{ c_j \mid \sum_{i=1}^{k} \text{cosine}(x, x_i) \cdot \delta(x_i, c_j) \geq T \right\}$$

where $\delta(x_i, c_j) = 1$ if $x_i$ is in category $c_j$ and 0 otherwise.

The approach of Naïve Bayes is to use the training data to estimate the probability of each category given the document feature values of a new instance. Bayes theorem is used to estimate the probabilities:

$$Pr(C = c_k \mid x) = \frac{Pr(x \mid C = c_k) Pr(C = c_k)}{Pr(x)}$$

The category with maximum probability determines the classification of the instance. The quantity $Pr(x|C=c_k)$ is impractical to compute without making the simplifying assumption that the features are conditionally independent in a given class C. This yields the following $$Pr(x \mid C = c_k) = \prod_i Pr(x_i \mid C = c_k)$$

While this assumption is generally not true for word appearance in documents, research has shown that there isn't obvious improvement when word dependency is taken into account. Once the calculation is made, a threshold can be applied such that if $Pr(C=c_k|x) \geq T$, then document x is classified in the class $c_k$.

Given a binary classification task, documents can be correctly/incorrectly classified as being in/out of the class as shown in the contingency table Table 2. Precision and recall are two fundamental measurements used to evaluate the performance of classifiers. Precision is the percentage of the documents classified by the system to the class that actually belong in that class. In other words, precision is a measure of how much junk is returned with the valuable information. Recall is the percentage of documents actually classified to the class among all the documents that belong in that class. In other words, recall is a measure of how much of the valuable information that is available is returned. Lowering the threshold used to determine whether or not a document belongs in a given class has the effect of increasing the recall, but decreasing the precision. Similarly, raising the threshold can improve precision at the expense of recall. By finding the precision/recall breakeven point, the threshold at which precision and recall are equal, both measures are given equal weight in the analysis.

When there are many categories to learn, a separate classifier is trained for each. Once precision/recall breakeven ratios are calculated for each category, they can be combined in either a micro-average or a macro-average. Let $x_i/y_i$ be the precision/recall breakeven for category i which represents $x_i$ documents among $y_i$ documents in category i are classified to the category by the system. The micro-average is the average of total number of documents properly classified for all categories by the system over all the documents that are in the categories $$\left( \sum_i x_i \bigg/ \sum_i y_i \right)$$

The macro-average is just the average of the individual category ratios over all the categories, $$\left( \frac{1}{n} \sum_i x_i / y_i \right)$$

The micro-average scores tend to be dominated by the classifier's performance on those categories that contain more documents, and the macro-average scores are influenced equally by the performance on all categories regardless of the number of documents they contain. We will demonstrate our results in terms of these measurements.

We ran experiments on three different data sets. The biggest data set is the reuters-21578 collection. This data set consists of newswire articles on a wide range of topics. Some of the topics include earnings, money/foreign currency exchange, grain, trade, etc. There are about 120 different topics in the collection. Based on the Lewis split we extracted 10802 stories in which 7780 are in the training set and 3022 are in the testing set. The number of stories in each category varied widely. For example the "earnings" category contains 3965 documents while many other categories contain only one document. We only used the 10 most frequent categories for the experiments. The number of training and testing examples in these 10 categories are shown in FIG. 11.

Figures 9, 10, 11:
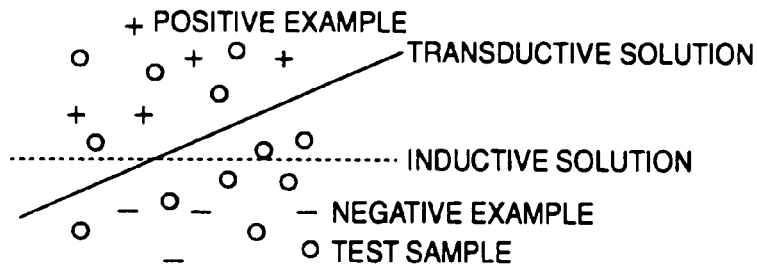
FIG. 9 is a plot of a transducive solution in feature space.
FIG. 10 is a contingency table for a category.
FIG. 11 is a table showing the number of documents and various categories.

For each category in FIG. 11 the numbers show the positive training and testing examples and the remaining extracted stories from the training and testing set are used as negative examples.

The exploration of text classification was originally motivated by automating Japanese patent reclassification with a developed scheme. Since we needed a set of properly classified technical patents with engineering terms, we chose some US patents on engineering from US PTO database. To reflect the real situation where categories can be very similar and for some categories there can be very few classified patents, we chose those patents from subclasses 31 and 32 in class 706 on neural networks in particular, with 50 patents in each class. Only title and abstract are included in the text analysis. To obtain training and testing data we split the two classes of 50 patents in two ways. One is randomly selecting 40 patents from each class as training documents and using the remaining 10 patents in each class as testing documents. The other way is randomly selecting 10 patents from each class as training documents and using the remaining 40 patents in each class as testing documents. We did 20 random selections for each way of splitting the data, ran our experiments on them and averaged the results separately for the two splits.

Figures 12, 13:
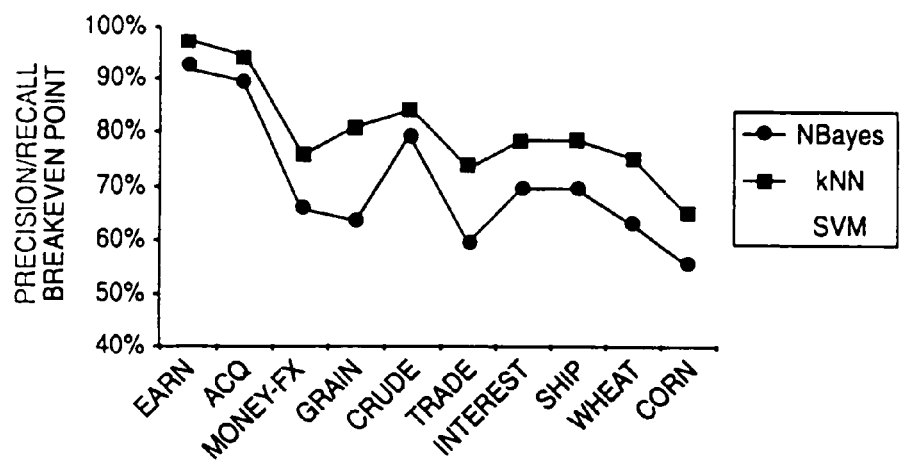
FIG. 12 is a plot of precision recall break-even point versus various topics.
FIG. 13 is a table of correctly classified documents in various categories.

On the Reuters-21578 collection, we obtained precision/recall breakeven point for the 10 most common categories using Naïve Bayes, k-Nearest Neighbor and Support Vector Machines. With such a large data set, the vocabulary size is very big. Considering the processing time and the training time we used a lower number of word stems to do the experiments. For all the methods we selected 500 words with highest information gain. For kNN we used the number of nearest neighbors equal to 50. For SVM we chose the kernel function to be radial basis function with gamma equal to 1. The breakeven point for the two methods for the 10 most frequent categories is summarized in FIG. 12.

Support Vector Machines works the best on all ten categories, the micro-average of breakeven for the ten categories is 92.93% and the macro-average of breakeven is 85.8%. k-Nearest Neighbors gives good precision/recall breakeven point close to that of SVM on the two most common categories, its micro-average over the ten categories is 89.44% and the macro-average is 79.6%. Naïve Bayes gives the lowest breakeven point, its micro-average over the ten categories is 82.81 and the macro-average is 70.39%.

The numbers included in are from the precision/recall breakeven calculation. From the recall perspective we can see that for category Earn, 1075 out of 1088 documents in Earn category are correctly classified only 13 documents are misclassified. From the precision perspective it means that there are also 13 documents not in Earn category are classified to this category. We can vary the decision threshold to get higher precision at the cost of lower recall or higher recall at the cost of lower precision. Human intervention can also be involved to further improve the classification accuracy. Some confidence scores may be given to documents to aid the human confirmation.

Figure 14:
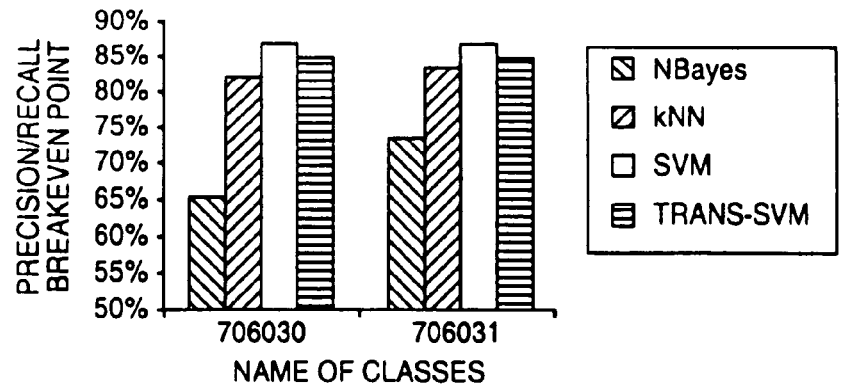
FIG. 14 is a plot of precision/recall break-even point for various systems.
Figure 15:
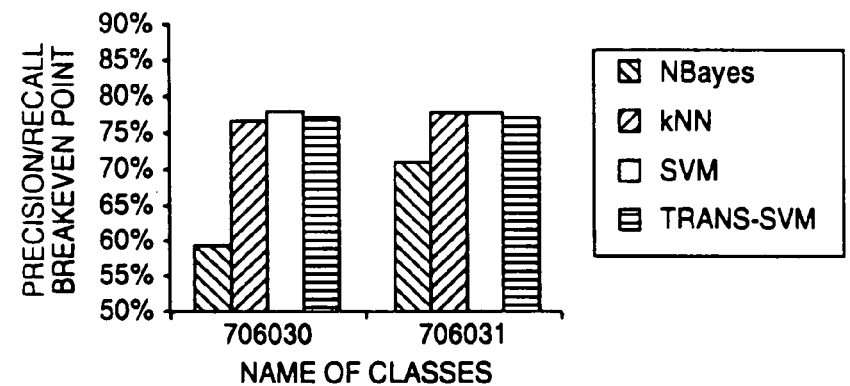
FIG. 15 is a plot of precision/recall break-even point for various systems.
Figure 16:
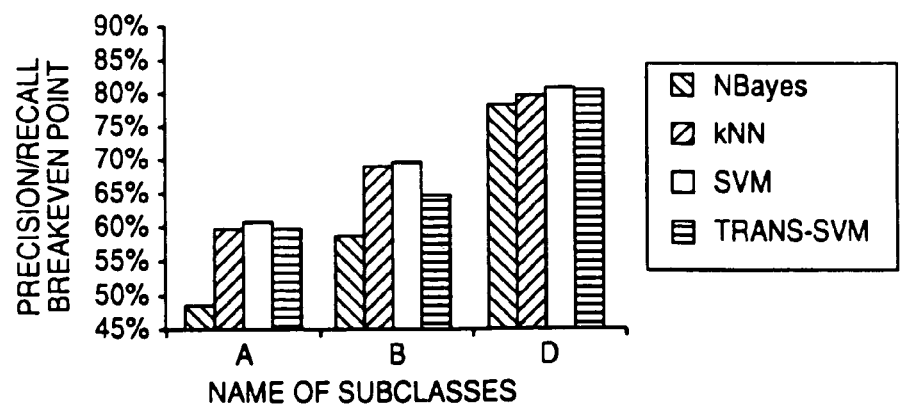
FIG. 16 is a plot of precision/recall break-even point for various systems.

On the two classes of neural network patents we compared breakeven points of SVM, Transductive SVM, kNN and Naïve Bayes by using all the word stems. The training and testing data of 50 documents were separated in two different ways. In the 40/10 split each class contains 40 training documents, in the 10/40 split there are 10 training documents in each class. By training SVMs using different kernel functions, we chose the kernel function of both SVM and Transductive SVM for the 40/10 split to be radial basis function with gamma equal to 2 and the kernel function of both SVM and Transductive SVM for the 10/40 split to be a polynomial of degree two. The number of nearest neighbors for kNN for both splits is chosen to be 5. The breakeven points of the three methods with two different ways of training and testing data split are shown in two separate diagrams in FIGS. 14 and 15. In the 40/10 split, SVM shows better performance than transductive SVM and both are better than kNN. In the 10/40 split SVM performs the best among three methods. From the literature, transductive SVM works better than inductive SVM when there is very few training data and sufficient amount of testing data. This is verified using provided sample data. However, using 10/40 split, the transductive SVM doesn't provide superior performance as expected with very few training documents. This could be because the entire data set is too small to show its difference from SVM. Naive Bayes has the lowest accuracy.

We also examined all these methods by using 50% of vocabulary based on information gain. The result shows ~±2.5% variation on the average breakeven. All three methods are very stable with respect to variation in feature dimensionality. With reasonable number of features selected both SVM and kNN generalize well. The results are not shown here.

Patents of subclasses A, B and D from are not evenly distributed. Subclass A contains only 8 documents and subclass D, the largest subclass, has 99 documents. Only 5 documents in subclass A are selected as positive training examples when classifiers are trained for subclass A, 88 documents from other two subclasses are used as negative training examples. Because of having very few positive training examples Naïve Bayes, kNN, SVM and Transductive SVM don't generalize well for subclass A. But the performances of different algorithms are improved for the other two subclasses, especially subclass D.

In the two patent data sets the classes in each data set are very similar which makes it very hard to achieve high performance scores. However, if classes are distinct enough it is easy to get very high accuracy. We also tried to classify two classes of patents that we downloaded from US PTO database with one class on neural networks the other on fuel cells. There are 40 training documents and 10 test documents in each class. Naïve-bayes, kNN, inductive and transductive SVMs were applied. All methods produce 100% classification accuracy.

It was found that SVM is the most accurate classifier on all trials among all the classifiers considered. KNN also gives good classification performance. When classes are distinct, classifiers can be very accurate. When classes are similar, classifiers will generalize well only if sufficient training data is available. From literature and our experiments using software provided sample data, transductive SVM shows its advantage, when there is minimal training data but plentiful test data. However, our experiment on a small data set did not explore this regime. Also when the training data set gets very large kNN slows down significantly. In general, Transductive SVM takes much longer to train than inductive SVM, but the classification times of both inductive and transductive SVM are efficient. In addition both SVM and KNN are very stable with different model parameters. Even with different kernel functions for SVM, the precision/recall breakeven points are very close. We also varied the number of nearest neighbors for kNN. The results show that optimal number of nearest neighbors is small relative to the size of training data set and feature length. For example, on Reuters-21578 collection 50 nearest neighbors were used for kNN where 500 features were chosen and the total number of training documents is 7780. The observation can be made that if the number of nearest neighbors for kNN is too large, small isolated categories may be difficult to distinguish from heavily populated categories. Even though Naïve Bayes is very efficient, it doesn't produce as accurate classification as SVM and kNN do. Results also indicate that classification with modestly lower or higher feature dimension does not appreciably affect the results.

From the above discussion we can conclude that SVM and kNN are efficient, robust and stable methods that give good classification performance. These methods can be used to automate the process of text document classification. For a small number of cases near the boundaries, misclassifications do occur. These situations can be handled by human intervention. It is also possible to introduce a degree of confidence measure to identify boundary cases. However, we note that the bulk of the classification task can be reliably automated, greatly reducing the work load for the experienced individuals who now perform these tasks.

While particular embodiments of the invention have been shown and described, numerous variations alternate embodiments will occur to those skilled in the art. Accordingly, it is intended that the invention be limited only in terms of the appended claims.

What is claimed is:

1. A method for classifying a document using a classification system comprising the steps of:
   defining a plurality of classes;
   identifying source documents of each of said plurality of classes;
   generating a classification theme score for each of said classes from the source documents for each of the plurality of classes;
   entering an unclassified document into the system;
   generating an unclassified document theme score corresponding to said unclassified document;
   classifying the unclassified document into one of said plurality of classes when the unclassified document theme score is substantially equal to the classification theme score;
   reclassifying a plurality of classes into a plurality of new classes by:
   identifying source documents for each of said plurality of new classes;
   generating a respective plurality of new class theme scores for each of said plurality of new classes;
   reclassifying documents within said plurality of classes into the plurality of new classes when a classified document theme score is substantially similar to one of the respective new class theme scores;

storing the reclassified documents in a document storage memory.

2. A method for classifying a document using a classification system comprising the steps of:

establishing a plurality of classes and a plurality of subclasses;

identifying source documents of each of said plurality of classes and said plurality of subclasses;

generating a classification theme score for each class and each subclass in response to the source documents;

entering an unclassified document into the system;

generating an unclassified theme score for the unclassified document; and classifying the document into one of said plurality of classes when the unclassified document theme score is substantially equal to the classification theme score;

reclassifying a plurality of classes into a plurality of new classes by:

identifying source documents for each of said plurality of new classes;

generating respective new class theme scores;

reclassifying documents with said plurality of classes into the plurality of new classes when the classified document theme score is equal to one of the respective new class theme scores;

storing the reclassified documents in a document storage memory.

3. A system for classifying documents comprising:

a document input for entering an unclassified document;

a document storage memory;

a controller coupled to said document input and document storage memory said controller programmed to classify documents into a plurality of classes by identifying source documents of each of said plurality of classes, generating a classification theme score categorizing documents into said classes, generating an unclassified theme score for the unclassified document, and classifying the document into one of said plurality of classes when the unclassified document theme score is substantially similar to the classification theme score, said controller further programmed to identify source documents for each of a plurality of new classes; generate respective new classification theme scores; reclassify documents with said plurality of classes into the plurality of new classes when the classified document theme score is substantially similar to the new class theme score; and store the reclassified documents in the document storage memory.

4. A system as recited in claim 3 wherein said controller is programmed to assign a weight to sections of an unclassified document.

5. A system as recited in claim 3 wherein said controller is programmed to classify documents into a subclass.

6. A system as recited in claim 3 wherein said document input comprises the Internet.

7. A system as recited in claim 3 wherein said document input comprises a scanner.

* * * * *